Webber & Reifsnyder,
Filling Barrels.

N° 51,370. Patented Dec. 5, 1865.

Witnesses
W. E. Mays
Geo. D. Nichols

Inventors
Henry Abel Webber
Charles Reifsnyder

UNITED STATES PATENT OFFICE.

H. A. WEBBER AND C. REIFSNYDER, OF CHICAGO, ILLINOIS.

IMPROVED APPARATUS FOR FILLING BARRELS.

Specification forming part of Letters Patent No. 51,370, dated December 5, 1865.

*To all whom it may concern:*

Be it known that we, HENRY A. WEBBER and CHARLES REIFSNYDER, of Chicago, in the county of Cook and State of Illinois, have invented a new and useful Improvement in Self-Closing Barrel-Fillers; and we do hereby declare that the following is a full, clear, and exact description of the same, reference being had to the accompanying drawings and the letters and figures marked thereon, which form part of this specification.

The nature of our said invention consists in a novel arrangement of a spring-valve with a float operated by the pressure of the liquid when the barrel or other vessel is filled, whereby the barrel-filler is closed automatically when the barrel is full; and also in a novel device whereby the barrel-filler is closed automatically by the pressure of the fluid in like manner whenever the barrel or cask is filled to any desired height.

To enable those skilled in the art to understand how to construct and use our invention, we will proceed to describe the same with particularity, making reference in so doing to the aforesaid drawings, in which—

Figure 2:
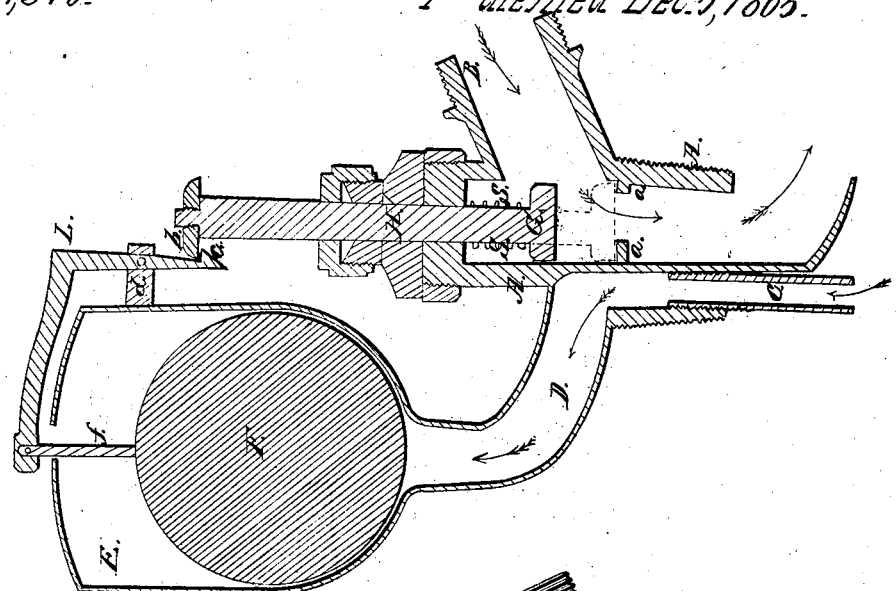
Figure 1:
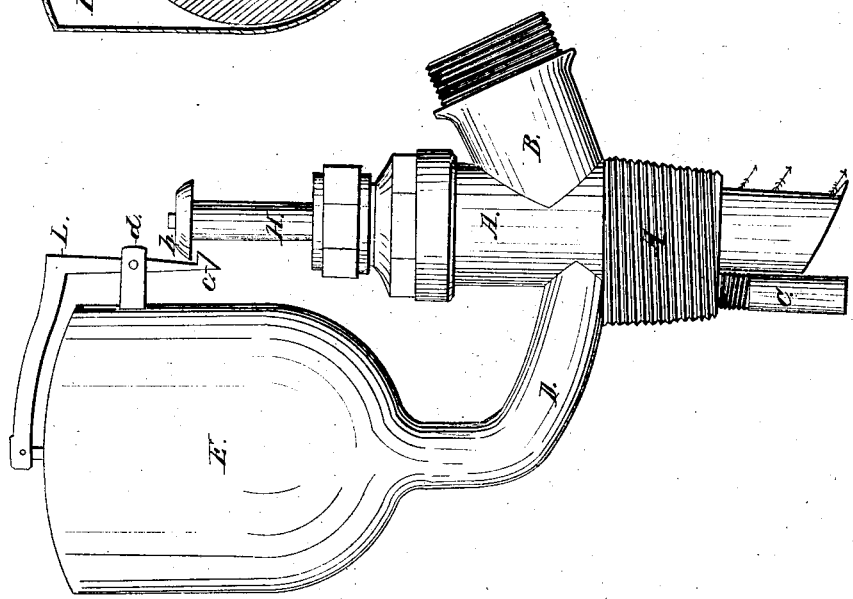

Figure 1 represents a side elevation of our invention, and Fig. 2 a vertical central section of the same.

Similar letters of reference in the different figures denote the same parts of our invention.

A represents that part of the apparatus which is screwed or otherwise secured in the bung-hole of the cask to be filled, and B represents the pipe through which the fluid enters the apparatus to pass into the barrel, as indicated by the red arrows in Fig. 2.

G represents a piston, which fits in the cylindrical cavity in A, being held down upon the seat $a$ by the action of a spring, S, or its equivalent, in the position shown by the dotted lines, and closing the barrel-filler, thereby preventing the liquid from the pipe B from entering the barrel.

H represents the piston-rod, whereby the valve or piston G is drawn up so as to open the apparatus, as shown by the full lines in Fig. 2.

The valve is held open by means of the hook $c$ upon the lever L, acting upon the projection $b$ upon the upper end of the piston or valve rod H.

The lever L is pivoted or fulcrumed at $d$, its opposite end being attached or connected with the float F by a rigid rod, $f$, in the manner shown.

F represents a float of wood; or it may be of hollow metal, provided only that it shall be of a less specific gravity than the liquid with which the barrel is to be filled. The said float rests in the chamber E, which is connected with the interior of the barrel by means of the pipe D and the adjustable tube C.

The parts being arranged as shown, the liquid runs into the barrel until it rises to the lower end of the outlet-tube or vent C, when it rises at once into the chamber E, raises the float F, detaches the catch $c$ from the valve-rod H, when the action of the spring S throws down the valve G and closes the apparatus.

The tube C is attached to the main apparatus by a screw, as shown, or in any suitable manner, to allow it to be adjusted up and down, so that the apparatus may be closed when the barrel is full or when filled to any desired height.

The apparatus may open at one side within the barrel, or it may open at the bottom, as may be preferred.

Having described the construction and operation of our invention, we will now specify what we claim and desire to secure by Letters Patent:

1. The combination of the valve G, float F, and lever L or its equivalent, arranged and operating substantially as specified and shown.

2. In combination with a self-closing barrel-filler operating substantially as described, the employment of an adjustable tube C, for the purposes specified.

HENRY ABEL WEBBER.
CHARLES REIFSNYDER.

Witnesses:
W. E. MAERS,
GEO. B. NICHOLS.